United States Patent [19]
Weis

[11] Patent Number: 6,090,298
[45] Date of Patent: Jul. 18, 2000

[54] METHOD AND APPARATUS FOR CLEANING FILTER MATERIAL IN A FILTER APPARATUS UTILIZING A SUCTION GENERATING ASSEMBLY

[75] Inventor: Ronald J. Weis, Davis, Ill.

[73] Assignee: Aqua-Aerobic Systems, Inc., Rockford, Ill.

[21] Appl. No.: 08/988,149

[22] Filed: Dec. 10, 1997

[51] Int. Cl.[7] .................................................. B01D 33/48
[52] U.S. Cl. ...................... 210/780; 210/791; 210/331; 210/391; 210/406; 210/408; 210/416.1
[58] Field of Search .................................. 210/331, 407, 210/406, 408, 416.1, 780, 391, 392, 393, 791, 784, 767

[56] References Cited

U.S. PATENT DOCUMENTS

| | | |
|---|---|---|
| 374,952 | 12/1887 | Falcon . |
| 946,476 | 1/1910 | Warner . |
| 1,042,295 | 10/1912 | Trent . |
| 1,259,139 | 3/1918 | Salisbury . |
| 1,335,695 | 3/1920 | Oliver . |
| 1,472,934 | 11/1923 | Paull . |
| 1,649,581 | 11/1927 | Genter et al. . |
| 1,700,772 | 2/1929 | McCaskell . |
| 1,971,090 | 8/1934 | Zwicky et al. ........................... 210/167 |
| 2,007,780 | 7/1935 | Wardle ..................................... 210/167 |
| 2,038,355 | 4/1936 | Liddell et al. ........................... 210/167 |
| 3,542,197 | 11/1970 | Rosaen . |
| 4,038,187 | 7/1977 | Saffran . |
| 4,090,965 | 5/1978 | Fuchs . |
| 4,639,315 | 1/1987 | Fuchs et al. . |
| 4,971,694 | 11/1990 | Richter . |
| 4,975,189 | 12/1990 | Liszka . |
| 5,314,616 | 5/1994 | Smith . |
| 5,362,401 | 11/1994 | Whetsel . |
| 5,374,360 | 12/1994 | Weis . |
| 5,464,533 | 11/1995 | Koslow . |
| 5,547,570 | 8/1996 | Richter . |

FOREIGN PATENT DOCUMENTS

| | | |
|---|---|---|
| 992138 | 5/1965 | United Kingdom . |

OTHER PUBLICATIONS

Aqua–Aerobic Systems, Inc., Bulletin No. 100M, Jan., 1993.

*Primary Examiner*—Robert J. Popovics
*Attorney, Agent, or Firm*—Michael Best & Friedrich LLP

[57] ABSTRACT

A filter apparatus includes a tank having an inlet and an outlet, a filter frame disposed inside the tank between the inlet and outlet, and filter material supported by the filter frame. The filter material filters out suspended solids from liquid influent that is passed through the filter material as the liquid influent flows from the inlet to the outlet. The filter apparatus is provided a suction generating assembly having a positive displacement pump, and a suction member in fluid communication with the pump and positioned adjacent an inlet surface of the filter material. The suction generating assembly is operable to draw filtered liquid in a reverse direction through the filter material to remove filtered solids therefrom. The filter apparatus also utilizes spray nozzles for directing a liquid stream of a cleaning solution at high velocity to the filter material thereby washing the filter material. The suction member is positioned relative to the filter material such that substantially all of the spent cleaning solution which results from operation of the spray nozzles are removed from the filter material by the suction generating assembly.

17 Claims, 2 Drawing Sheets

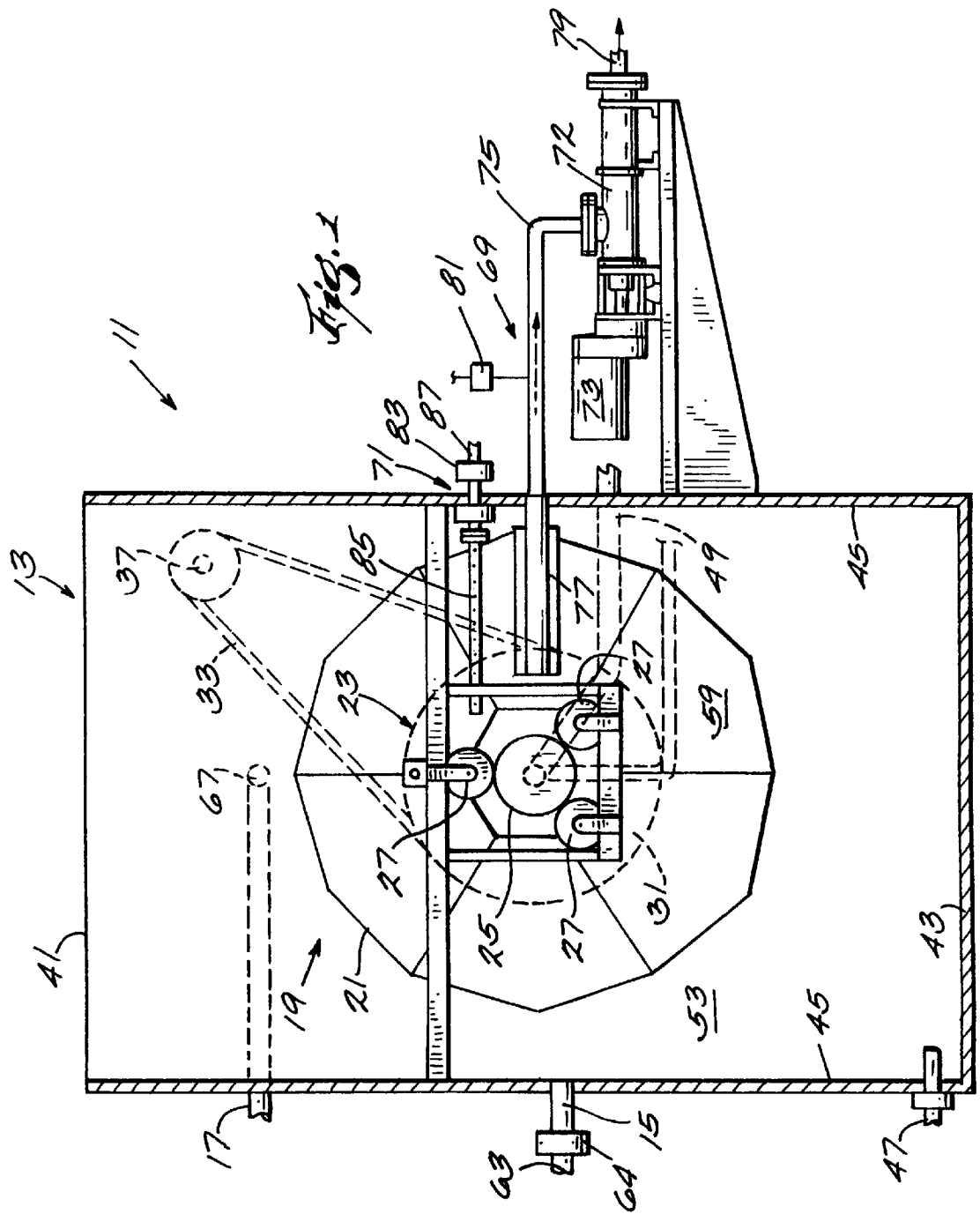

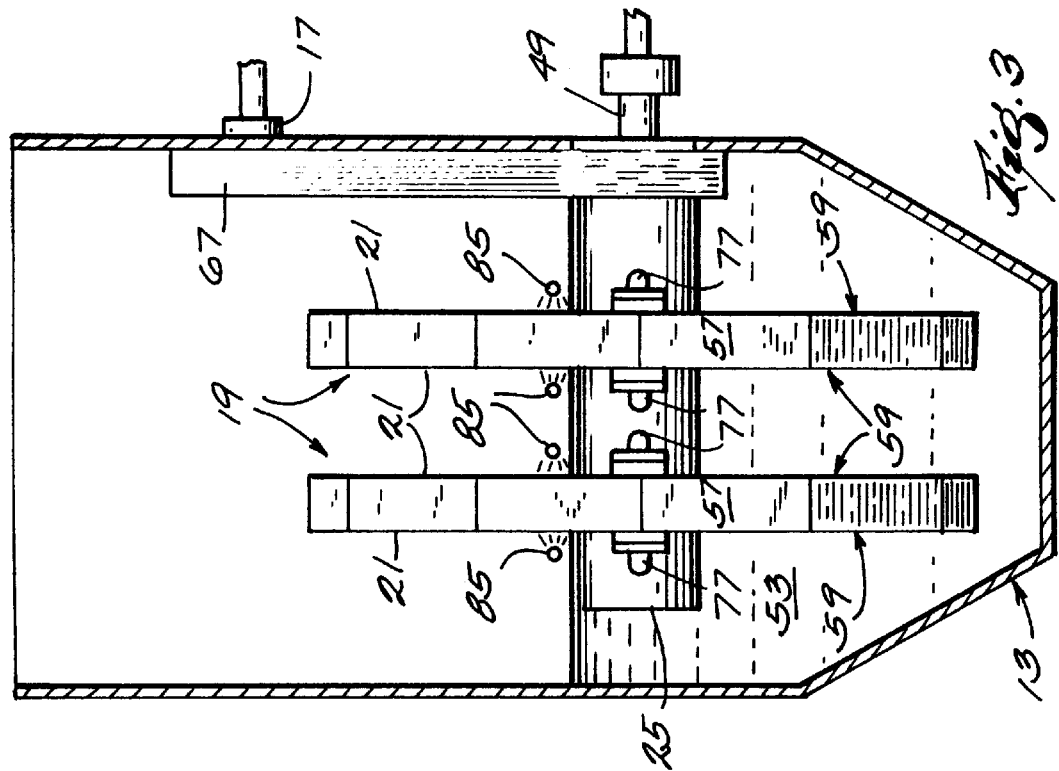
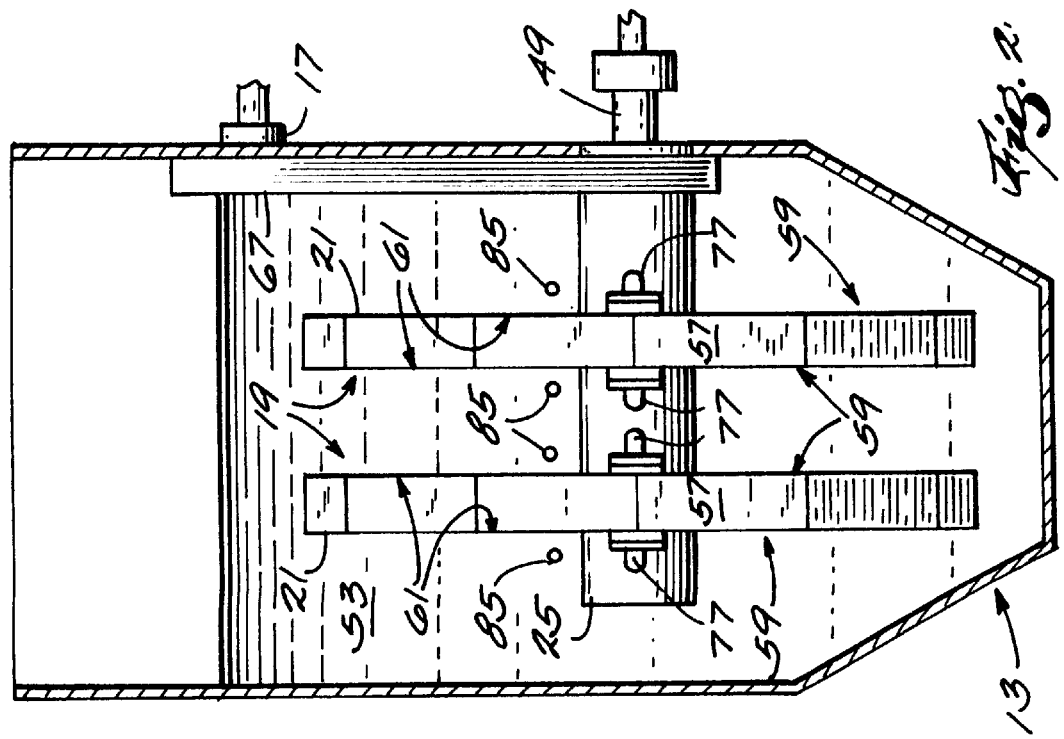

METHOD AND APPARATUS FOR CLEANING FILTER MATERIAL IN A FILTER APPARATUS UTILIZING A SUCTION GENERATING ASSEMBLY

FIELD OF THE INVENTION

The present invention relates generally to a filter apparatus for filtering out suspended solids from liquid influent that is passed through filter material. More particularly, the present invention relates to a method and apparatus for cleaning the filter material.

BACKGROUND OF THE INVENTION

One type of filter apparatus for filtering suspended solids includes a tank having an inlet and an outlet, a filter frame positioned between the inlet and outlet, and filter material supported within the filter frame. During a filtering operation, liquid influent is passed through the filter material such that the filter material filters out suspended solids from the influent stream. The filtered solids are deposited on the filter material while the filtered liquid stream is discharged from the tank as effluent.

To remove the filtered solids from the filter material, it is known to provide the filter apparatus with a centrifugal pump that is connected to a suction head positioned adjacent a surface of the filter material. The centrifugal pump is operated to draw filtered liquid through the filter material in a backwash or reverse direction. The liquid flow that results acts to dislodge solids which have been deposited on the surfaces of the filter material.

In practice, however, filtered solids continue to accumulate within the filter media at an increasing rate despite successive backwash operations. Some of the solids become so deeply embedded in the filter material that the backwash flow is ineffective in dislodging these solids. Accordingly, in a second cleaning step, a high-pressure liquid spray is directed from one or more spray nozzles to the surface of the filter material. The high pressure spray penetrates the surface, impacts the deeply embedded solids, and dislodges these solids from the filter material.

However, in order for the spray to be effective, the tank must be drained of sufficient liquid volume so that the spray nozzles are above the liquid level. This typically requires the filtering operation to be stopped for the duration of the spray operation. Therefore, to minimize filter downtime, the spray operation is initiated only when solids accumulation on the filter material is so great that the backwash stream is rendered ineffective, or alternatively, when it is convenient to stop the filtering operation.

SUMMARY OF THE INVENTION

The present invention relates to a filter apparatus for filtering suspended solids from liquid influent. The filter apparatus includes a tank having an inlet for receiving liquid effluent and an outlet for filtered effluent, a frame positioned inside the tank, and filter material supported by the frame, the filter material having an inlet surface and an outlet surface. During a filtering operation, liquid influent is passed through the filter material in a direction from the inlet surface to the outlet surface. The present invention is particularly directed to improvements in an apparatus and a method for cleaning the filter material of filtered solids.

In one aspect of the invention, the filter apparatus is provided with a suction generating assembly that includes a positive displacement pump and a suction member (e.g., suction heads) in fluid communication with the positive displacement pump. The suction member is positioned adjacent a portion of the filter material such that the positive displacement pump is operable to draw liquid through the filter material to remove filtered solids from the filter material. Preferably, the suction member is positioned adjacent the inlet surface of the filter material such that the positive displacement pump is operable to draw filtered liquid through the filter material in a reverse direction.

The filter apparatus may also include a means for washing a portion of the filter material (e.g., a spray nozzle) by directing a liquid stream of cleaning solution to the filter material. The suction member is positioned relative to the washing means such that the suction generating assembly is adapted to remove spent cleaning solution from the filter material during operation of the washing means. Preferably, the washing means is positioned to direct the liquid stream against a first portion of the filter material above the liquid level, and the suction member is positioned adjacent a second portion of the filter material below the first portion.

In a method of cleaning the filter material according to the present invention, the suction member is positioned adjacent an inlet surface of the filter material and the positive displacement pump is operated such that the suction generating assembly draws liquid through a section of the filter material in a reverse direction. In this way, filtered solids are removed from the filter material by the resulting backwash stream. Preferably, the filter material is moved relative to the suction member such that liquid is drawn through more than one section of the filter material.

The cleaning method may further include the steps of lowering the liquid level in the filter tank before the washing step and directing a liquid stream of cleaning solution to a portion of the filter material above the liquid level. The suction member is preferably positioned adjacent a second portion of the material that is below the first portion and such that the suction generating assembly removes spent cleaning solution from the filter material during the washing step.

The present invention provides a method and an apparatus for cleaning the filter material while the filter frame remains inside the tank and while the filter apparatus is in the filtering mode. A first advantage of the present invention over prior art methods and devices for cleaning filter material supported within similarly constructed filter devices is that the method and apparatus of the invention maintains the filter material in a substantially clean, and thus, effective filtering condition for longer periods of filter operation. This advantage results from the ability of the suction generating assembly of the present invention to retard the rate at which filtered solids accumulate on the filter material, compared to prior art filter cleaning devices. Consequently, because the filtered solids do not accumulate on the filter media as rapidly, it is not necessary to interrupt the filter operation as frequently to clean the filter material.

It is also a feature and an advantage of the present invention to provide a method for cleaning filter material wherein substantially all of the runoff resulting from a washing step is removed directly from the filter material and discharged.

It is yet another feature and an advantage of the present invention to provide a more effective method for cleaning filter material and a method that does not substantially add to the wastewater burden of the filter apparatus.

BRIEF DESCRIPTION OF THE DRAWINGS

FIG. 1 is a diagrammatic vertical sectional view through the filter apparatus.

FIG. 2 is a diagrammatic vertical sectional view through the filter apparatus illustrating the apparatus in a filtering mode.

FIG. 3 is a diagrammatic vertical sectional view through the filter apparatus illustrating the filter apparatus in a wash mode.

DETAILED DESCRIPTION OF THE PREFERRED EMBODIMENT

FIG. 1 depicts a filter apparatus 11 embodying the present invention. The filter apparatus includes a filter tank 13 having an influent inlet 15 and an effluent outlet 17, a pair of filter frames 19 disposed between the influent inlet 15 and the effluent outlet 17, and filter material 21 supported by each filter frame 19. In alternative embodiments, the filter apparatus 11 can include additional filter frames or a single filter frame.

The filter frames 19 are covered by filter material 21, and are generally vertically disposed and spaced apart in parallel relation. Each filter frame 19 is supported by, and fixed to, a horizontally disposed hollow drum 25 that is supported for rotation about its central longitudinal axis by a mounting assembly 23. The mounting assembly 23 includes at least three rollers 27 which engage an outer surface of the hollow drum 25. The rollers 27 allow the hollow drum 25 and the filter frames 19 to be rotated about the longitudinal axis of the drum 25. A sprocket 31 encircles the hollow drum 25, and a chain drive 33 drivingly engages the sprocket 31. The chain drive 33 is adapted to be driven by a motor 37 for rotating the hollow drum 25 and filter frames 19.

The filter tank 13 has an open top 41, a bottom 43, and side walls 45. Near the tank bottom 43, a bottom drain outlet 47 is provided for removing solids accumulation on the tank bottom 43 and a wash drain outlet 49 is provided for lowering the liquid level in the filter tank 13. An influent chamber 53 is defined by the liquid retaining space inside the filter tank 13 that is outside of the filter frames 19. Further, a pair of effluent chambers 57 are defined by the spaces enclosed by the filter material 21 (see FIG. 2). Each filter frame 19 has a pair of parallel spaced part outer surfaces or influent surfaces 59 which face the influent chamber 53. Referring to FIG. 2, the filter material 21 also has a pair of parallel spaced apart inner surfaces or effluent surfaces 61, located inside of the filter frames 19, that face the effluent chamber 57.

During filter operation, liquid influent containing suspended solids is supplied by gravity feed or from a pump (not shown) to an influent supply line 63 controlled by a valve 64. Through the influent supply line 63, liquid influent enters the influent chamber 53 and is passed through the filter material 21 of the filter frames 19. As the liquid passes through the filter material 21, the suspended solids are filtered out by the filter material 21. The filtered liquid flows through the filter material 21, and into the effluent chamber 57 which is fluidly connected by seals to hollow drum 25, the rising conduit 67, and the effluent outlet 17. The effluent outlet 17 is typically positioned at a level adjacent the uppermost portions of the filter frames 19. During normal filtering operation, the filter frames 19 are stationary and are not rotated.

The filter apparatus 11 includes a suction generating assembly 69 preferably mounted adjacent the outside of the filter tank 13 and in fluid communication with the filter tank 13. The suction generating assembly 69 includes a positive displacement pump 72 driven by a motor 73, suction piping 75 connected to the pump 72, a plurality of suction members or suction heads 77, and discharge conduit 79. The suction heads 77 are positioned inside the tank 13, preferably adjacent the influent surfaces 59 of the filter material 21. In alternative embodiments, the suction heads 77 may be positioned adjacent the effluent surface. Typically, the filter material 21 is a flexible material such as cloth which flexibly conforms to the suction head 77 when the positive displacement pump 72 is operated.

When the positive displacement pump 72 is operated, suction heads 77 draw filtered water from the effluent chambers 57 through the filter material 21 in a direction reverse of the normal filtering direction. The resulting backwash stream removes the filtered solids from the filter material 21 and carries the dislodged solids to discharge conduit 79 for discharge at a location (not shown) external of the filter tank 13. Preferably, the filter frame 19 is rotated during the backwashing operation by energizing motor 37 and driving sprocket 31 through drive chain 33. In this manner, substantially all of the influent surfaces 59 of the filter material 21 are brought into contact with the suction heads 77.

The filter apparatus 11 also includes a liquid directing means 71 that is operable to direct a high velocity liquid steam to the surfaces of the filter material 21. There are solids that become deeply embedded in the filter material 21 and cannot be removed by backwashing alone. In time, these solids accumulate so heavily on and within the filter material 21 that the effectiveness of the backwashing operation, as well as that of the filtering operation, is significantly reduced. The liquid directing means 71 is particularly adapted for cleaning the filter material 21 of such deeply embedded solids, in a cleaning operation referred to as the filter wash operation.

The liquid directing means 71 includes a high-pressure pump 83 that is connected to four sets of spray nozzles or nozzle heads 85. Each nozzle head 85 is positioned nearly adjacent an influent surface 59 of the filter material. When actuated, the high-pressure pump 83 delivers a liquid stream at high pressure to each of the nozzle heads 85, and each nozzle head 85 directs a high velocity liquid stream against a portion of the surface 59. The liquid stream acts to wash the influent surface 59 and to remove solids that have accumulated thereon. The liquid stream also penetrates the influent surface 59 to impact and dislodge filtered solids entrained within the filter material 21. In an alternative arrangement, the nozzle heads 85 are positioned inside the effluent chambers 57 to direct liquid streams in opposite directions against portions of the effluent surfaces 61.

A pressure sensing device 81 is provided at a fixed location on the suction piping 75. The pressure sensing device 81 provides a measure of the extent of solids accumulation on the filter material 21 by monitoring the suction pressure at a pre-determined point in the backwash stream. In this way, the sensing device 81 indirectly measures the flow energy losses across the filter material 21 caused by solids accumulation. When solids accumulation reaches a pre-determined undesirable level, i.e., such that the backwash operation is ineffective, the filter wash operation may be initiated.

Prior to the filter wash operation, the liquid level in the influent chamber 53 is preferably lowered to a height below the nozzle heads 85 but above the suction heads 77 (see FIG. 3). This may be done by stopping the filter operation and using the wash drain outlet 49 to reduce the liquid volume in the tank 13. By exposing the nozzle heads 85, the liquid directing means 71 can be operated more efficiently and more effectively.

The runoff which results from the filter wash operation is comprised primarily of spent liquid and dislodged solids. Most of the runoff travels down the filter material 21 toward the liquid level. In the filter apparatus 11 embodying the invention, the suction heads 77 and the nozzle heads 85 are positioned relative to the filter material 21 such that the runoff may be captured by the suction generating assembly 69 after the runoff penetrates the liquid level. In removing the runoff from the filter material 21, the suction generating assembly 69 prevents the runoff from dissipating into the influent chamber 53 or settling to the tank bottom 43. In FIGS. 1–3, the nozzle heads 85 are shown positioned above the liquid level and near the influent surfaces 59 of the filter material 21. Each of the suction heads 77 is positioned below the liquid level and directly below one of the nozzle heads 85. Alternatively, the nozzle heads 85 may be positioned inside of the filter frame 19 to direct a high velocity liquid stream to an effluent surface 61 of the filter material 21. Even when the nozzle heads 85 are positioned inside the filter frames 19, the suction heads 85 may remain positioned outside of the filter frame 19 where they are engageable with a portion of the influent surface 59 that intersects the downward travel of runoff.

The liquid directing means 71 includes a conduit 87 between the suction side of the high-pressure pump 83 and a secondary tank or holding container (not shown). In this arrangement, the pump 83 is operable to draw liquid, preferably a commercially-available chemical cleaning solution, from the holding container and to direct a high velocity liquid stream to the nozzle heads 85. In a further embodiment, the holding container is connected to the drum header 25 of the filter tank 13 such that filtered effluent may be transferred into the holding container to be utilized as the liquid medium for the liquid directing means 71.

Operation of the suction generating assembly 69 will now be examined in more detail. As solids accumulate on the filter material 21 during successive or continuous filter operations, the friction loss across the filter material 21 increases. In prior art filtering devices, wherein a centrifugal pump is used as a backwash pump, this rise in friction loss increases the total head for the pump, which, in turn, results in a reduction in pump flow rate. Thus, the capacity of the backwash stream to dislodge deeply embedded solids from the filter material diminishes with time and as more solids accumulate in the filter material.

It has now been discovered that the above-described phenomenon which occurs during operation of prior filtering devices is largely attributable to the centrifugal pump's performance under the backwashing conditions. The effectiveness of the backwash stream is reduced by the centrifugal pump's inability to maintain a high flow rate and adequate backwash stream momentum through the duration of one or several filter operations.

For the backwash stream to effectively dislodge deeply embedded solids from within the filter material, the backwash stream must transfer sufficient fluid momentum to the solids for the solids to overcome both inertia and the grasp of the filter mesh. Momentum in the suction stream depends on the flow rate generated by the pump. As more solids accumulate within the filter material, the friction loss across the filter material increases which increases the total head for the pump. With a centrifugal pump, this increase in total head often results in a significant reduction in pump flow rate. This reduction in pump flow rate results in a decrease in the momentum of the backwash stream and in the capacity of the backwash stream to dislodge solids from the filter material. As a result, solids accumulate in the filter material at an accelerated rate which causes even higher friction losses. In turn, the higher friction losses causes a further increase in total head and a reduction in pump flow rate.

In the filter apparatus 11 embodying the invention, the degenerative effect described above is addressed by utilizing a positive displacement pump 72 (e.g., a progressive cavity pump) for the backwash operation instead of a centrifugal pump. The positive displacement pump 72 is less sensitive to an increase in total head than a centrifugal pump. Accordingly, increases in friction loss across the filter material 21 do not produce as significant a reduction in the flow rate output. As solids accumulate on the filter material 21, the flow rate generated by operation of the positive displacement pump 72, as well as the momentum of the backwash stream, is maintained at higher levels for longer durations. Therefore, the rate at which solids accumulate within the filter material 21 increases less rapidly when a positive displacement pump 72 is used then when a centrifugal pump is used.

The advantages realized through use of a positive displacement pump 72 in the above-described cleaning method are two-fold. One, solids accumulate within the filter material 21 at a reduced rate. Two, because the solids do not accumulate within the filter material 21 as rapidly, the time interval between filter wash operations is longer and filter downtime is reduced.

FIG. 2 depicts the filter apparatus 11 during a normal filter operation. The liquid level in the filter tank 13 is above the filter frames 19 and the filter material 21 is completely immersed in the liquid. In this mode, the positive displacement pump 72 may be operated to backwash the filter material 21. Moreover, the filter frames 19 may be rotated in conjunction with the operation of the positive displacement pump 72 so that substantially all of the influent surfaces 59 of the filter material 21 are subjected to backwashing.

FIG. 3 depicts the filter apparatus 11 in the filter wash mode. Prior to operation of the liquid directing means 71, the liquid level in the tank 13 may be lowered below the nozzle heads 85 by draining influent through the wash drain outlet 49. FIGS. 2 and 3 also illustrate the preferred positioning of the suction head 77 relative to the liquid directing means 71. The nozzle heads 85 are operated to direct a high-velocity stream of cleaning solution to the surfaces 59 of the filter material 21. Moreover, the filter frame 19 may be rotated about both the nozzle heads 85 and the suction heads 77 such that a substantial portion, if not all, of the filter material 21 is subjected to a wash.

While one embodiment of the present invention has been shown and described, alternate embodiments will be apparent to those skilled in the art and are within the intended scope of the present invention. Therefore, the scope of the present invention is to be limited only by the following claims.

What is claimed is:

1. A filter apparatus for filtering suspended solids from liquid influent, the filter apparatus comprising:

a tank having an inlet for receiving liquid influent and an outlet for filtered effluent;

filter material supported inside the tank, the filter material having an inlet surface and an outlet surface, wherein the liquid influent can be passed through the filter material in a direction from the inlet surface to the outlet surface; and a suction generating assembly including a positive displacement pump and a suction member in fluid communication with the positive displacement pump, the suction member being positioned adjacent the filter material such that the suction generating assembly is operable to draw liquid through the filter material to remove filtered solids from the filter material.

2. The filter apparatus of claim 1, wherein the suction member is positioned adjacent the inlet surface of the filter material such that the suction generating assembly is operable to draw filtered liquid through the filter material in a reverse direction.

3. The filter apparatus of claim 1, further comprising:

means for washing a portion of the filter material by directing a stream of cleaning solution to the filter material, wherein the suction member is positioned relative to the washing means such that the suction generating assembly is adapted to remove spent cleaning solution from the filter material during operation of the washing means.

4. The filter apparatus of claim 3, wherein the tank has a liquid level, the washing means being positioned to direct the stream of cleaning solution to a portion of the filter material above the liquid level.

5. A method of cleaning filter material of a filter apparatus, the filter apparatus including a tank having an inlet for receiving liquid influent and an outlet for filtered effluent, the filter material being supported inside the tank between the inlet and the outlet and for filtering out suspended solids from liquid passed through the filter material as the liquid flows from the inlet to the outlet, the filter material having an inlet surface and an outlet surface, the cleaning method comprising the steps of:

providing a positive displacement pump;

providing a suction member in fluid communication with the positive displacement pump;

positioning the suction member adjacent the filter material; and operating the positive displacement pump such that the suction member draws liquid through a section of the filter material to remove filtered solids from the filter material.

6. The cleaning method of claim 5, wherein the step of positioning the suction member includes positioning the suction member adjacent the inlet surface of the filter material such that liquid is drawn through the filter material in a reverse direction during operation of the positive displacement pump.

7. The cleaning method of claim 5, further comprising the step of:

moving the filter material relative to the suction member during operation of the positive displacement pump, such that liquid is drawn through more than one section of the filter material.

8. The cleaning method of claim 5, further comprising the step of:

washing a portion of the filter material by directing a liquid stream of cleaning solution to the portion of the filter material; and wherein the step of positioning the suction member includes positioning the suction member relative to the portion of the filter material such that the suction member removes spent cleaning solution from the filter material during the washing step.

9. The cleaning method of claim 8, further comprising the step of:

lowering a liquid level of the filter tank before the washing step such that the liquid stream of cleaning solution is directed to a first portion of the filter material, the first portion being above the liquid level; and wherein the step of positioning the suction member includes positioning the suction member adjacent a second portion of the filter material, the second portion being below the first portion.

10. A cleaning apparatus for removing filtered solids from filter material of a filter apparatus, wherein the filter apparatus includes a tank having an inlet for receiving liquid influent and an outlet for filtered effluent, the filter material being supported inside the tank between the inlet and the outlet and for filtering out suspended solids from liquid passed through the filter material as the liquid flows from the inlet to the outlet, the filter material having an inlet surface and an outlet surface, the cleaning apparatus comprising:

a positive displacement pump; and a suction member in fluid communication with the positive displacement pump, the suction member being positioned adjacent the filter material such that liquid is drawn through the filter material when the positive displacement pump is operated to remove filtered solids from the filter material.

11. The cleaning apparatus of claim 10, wherein the suction member is positioned adjacent the inlet surface of the filter material such that liquid is drawn in a reverse direction through a section of the filter material during operation of the positive displacement pump.

12. The cleaning apparatus of claim 10, wherein the positive displacement pump is fixedly mounted adjacent the filter apparatus.

13. A filter apparatus for filtering suspended solids from liquid influent, the filter apparatus comprising:

a tank having an inlet for receiving liquid influent and an outlet for filtered effluent;

filter material supported inside the tank, the filter material having an inlet surface and an outlet surface, wherein the liquid influent can be passed through the filter material in a direction from the inlet surface to the outlet surface;

means for washing a portion of the filter material by directing a stream of cleaning solution to the filter material; and a suction generating assembly including a positive displacement pump and a suction member in fluid communication with the positive displacement pump, the suction member being positioned adjacent the filter material and relative to the washing means such that the suction generating assembly is adapted to remove spent cleaning solution from the filter material during operation of the washing means.

14. The filter apparatus of claim 13, wherein the suction member is positioned adjacent the filter material such that the suction generating assembly is operable to draw liquid through the filter material to remove filtered solids from the filter material.

15. The filter apparatus of claim 14, wherein the suction member is positioned adjacent the inlet surface of the filter material such that the suction generating assembly is operable to draw filtered liquid through the filter material in a reverse direction.

16. The filter apparatus of claim 13, wherein the tank has a liquid level, the washing means being positioned to direct the stream of cleaning solution to a portion of the filter material above the liquid level.

17. The filter apparatus of claim 16, wherein the suction member is positioned adjacent a second portion of the filter material, the second portion being below the first-mentioned portion.

* * * * *